United States Patent [19]

Mori

[11] Patent Number: 4,529,669
[45] Date of Patent: Jul. 16, 1985

[54] WELDED STRUCTURE FOR USE AT VERY LOW TEMPERATURES

[75] Inventor: Takanobu Mori, Hitachi, Japan

[73] Assignee: Hitachi, Ltd., Tokyo, Japan

[21] Appl. No.: 532,521

[22] Filed: Sep. 15, 1983

[30] Foreign Application Priority Data

Sep. 20, 1982 [JP] Japan ................. 57-162364

[51] Int. Cl.$^3$ .............................................. B32B 15/00
[52] U.S. Cl. ..................... 428/683; 310/52; 428/685
[58] Field of Search .......... 310/10, 52, 64, 61, 310/261; 428/683, 685; 75/124 B, 126 J; 148/127

[56] References Cited

U.S. PATENT DOCUMENTS

| 4,016,444 | 4/1977 | Gillet | 310/52 |
| 4,062,705 | 12/1977 | Gondo et al. | 75/124 B |
| 4,171,494 | 10/1979 | Yamaguchi et al. | 310/52 |

Primary Examiner—Melvyn J. Andrews
Assistant Examiner—Debbie Yee
Attorney, Agent, or Firm—Antonelli, Terry & Wands

[57] ABSTRACT

A welded structure for use at very low temperatures having structural metallic members of austenitic stainless steel welded with a welding material of austenitic stainless steel. The oxygen content of the portion of the deposited metal where there is no dilution with the material of the structural metallic member is not greater than 0.06 wt %. The structural metallic members and the deposited metal have chemical compositions consisting essentially of 0.01 to 0.1 wt % of C, 0.05 to 1 wt % of Si, 1 to 10 wt % of Mn, 8 to 20 wt % of Ni, 16 to 22 wt % of Cr and the balance substantially Fe and have a fully austenite structure. The Ni equivalent of the deposited metal ranges between 17 and 22. The welded structure for use at very low temperatures can be used, for example, as the container for the magnet of a superconducting generator rotor.

7 Claims, 9 Drawing Figures

WELDED STRUCTURE FOR USE AT VERY LOW TEMPERATURES

BACKGROUND OF THE INVENTION

The present invention relates to a novel welded structure for use at very low temperatures and, more particularly, to a welded structure such as container produced by welding from austenitic stainless steel for housing a superconducting magnet.

Hitherto, austenitic stainless steel has been used as a material for use at a very low temperature of 4.2° K. Welding rods or wires of the groups of D308, 308L, 316, 316L as specified in JIS (Japanese Industrial Standard) have been used as the welding material for welding this material. In general, in order to avoid hot weld crack of the deposited metal obtained after the welding, the compositions of these welding materials are so adjusted as to cause crystallization of at least several percent of delta ferrite.

The container for superconducting magnet is strictly required to be non-magnetic. Therefore, when the aforementioned material for use at very low temperatures is used as the material of the superconducting magnet container, the crystallization of delta ferrite, which is ferromagnetic, is not preferred. The present inventors have found also that the delta ferrite is one of the factors which impairs the toughness of the deposited metal at very low temperatures. Therefore, the crystallization of delta ferrite is not preferred also from the view point of toughness of the deposited metal. By the above-mentioned reasons, the deposited metal in the prior art was not satisfactory for use at very low temperatures.

SUMMARY OF THE INVENTION

1. Object of the Invention

Accordingly, it is a primary object of the invention to provide a welded structure for use at very low temperatures improved to avoid hot weld crack and to ensure high toughness at very low temperatures.

2. Explanation of the Invention

Through an intense study, the present inventors have confirmed that C and N among several interstitial type elements contained in the deposited metal of austenitic stainless steel do not adversely affect the toughness of such deposited metal at very low temperatures, but the toughness is adversely affected by oxygen which is also an interstitial type element contained in the deposited metal. More specifically, oxygen does not cause any unfavourable effect insofar as the oxygen content is so small that whole of oxygen exists in the form of solid solution in the steel, but produces undesirable effect when the oxygen content is increased to allow the presence of oxygen in the form of oxides. The inventors have found that quite a high toughness is obtained when the oxygen content is not greater than 0.06 wt %.

Thus, the present invention provides a welded structure for use at very low temperatures produced by welding metallic members of austenitic stainless steel by a welding material which is also of austenitic stainless steel, wherein the oxygen content of the portion of the deposited metal where there is no dilution with the material of the metallic members is not greater than 0.06 wt %.

The oxygen content in the deposited metal can be adjusted by adding one or more of elements which exhibit high affinity to oxygen, such as Al, Ti, Zr, Y, Ca, Mg and rare earth elements, to the welding rod and the filler metal. When a covered electrode is used, the oxygen content can be adjusted by using a flux which contains one or more of the above-mentioned elements.

By maintaining the oxygen content of the deposited metal at the level of 0.06 wt % or smaller, it is possible to obtain a material which has a high impact absorbed energy (referred to simply as "absorbed energy", hereinunder) at 4.2° K. It is impossible to perfectly eliminate the oxygen, i.e. to reduce the oxygen content to zero. In addition, it is unadvisable to reduce the oxygen content down to 0.005 wt % or lower because additional, especial advantage cannot be obtained thereby notwithstanding an enormous effort required for further reducing the oxygen content. The preferable oxygen content is 0.01 to 0.05 wt %.

The term "very low temperatures" in this specification is used to mean temperatures below −150° C. such as those exhibited by liquid oxygen (−183° C.), liquid nitrogen (−196° C.) and liquid helium (4.2° K).

According to the invention, both of the base metal and the deposited metal of the welded structure have a composition consisting essentially of 0.01 to 0.1 wt % of C, 0.05 to 1 wt % of Si, 1 to 10 wt % of Mn, 8 to 20 wt % of Ni, 16 to 22 wt % of Cr and the balance substantially Fe. Besides these constituents, the base metal and the deposited metal can contain at least one of 0.01 to 4 wt % of Mo and 0.01 to 0.2 wt % of N.

3. Preferred Composition Range of each Constituent

C: In order to stabilize the austenite and to ensure a sufficient strength at very low temperatures, the C content should be at least 0.01 wt %. On the other hand, a C content exceeding 0.1 wt % will impair the toughness at very low temperatures. For these reasons, the C content is preferably selected to range between 0.01 and 0.1 wt %.

Si: This element serves effectively as a deoxidizer when its content is 0.05 wt % or greater. Addition of Si in excess of 1 wt %, however, unfavourably increases the sensitivity to hot weld crack. For this reason, the Si content is selected to range between 0.05 and 1 wt %, preferably between 0.1 and 0.6 wt %.

Mn: This element, when its content is 1 wt % or greater, serves as a deoxidizing element, as well as an element for suppressing the hot weld crack, and further as an element for producing a solid solution of N which undesirably causes blow holes. An Mn content exceeding 10 wt %, however, increases the tendency of generation of delta ferrite to decrease the toughness at very low temperatures. The Mn content, therefore, is selected to fall within the range between 1 and 10 wt %. The addition of Mn offers another advantage to allow a reduction in Si content. The Mn content is determined preferably to range between 1 and 6 wt %.

Ni: In order to stabilize the austenite and to ensure sufficient toughness at very low temperatures, the Ni content should be at least 8 wt %. These effects, however, are saturated when the Ni content is increased beyond 20 wt %. The Ni content, therefore, is selected to be 8 to 20 wt %, preferably 10 to 18 wt %.

Cr: Addition of at least 16 wt % of Cr is effective in improving the corrosion resistance and strength at very low temperatures, as well as in stabilizing the austenite. A Cr content exceeding 22 wt %, however, allows the formation of delta ferrite to lower the toughness at very low temperatures. The Cr content, therefore, should be selected to range between 16 and 22 wt %.

Mo: This element is effective in increasing the corrosion resistance and suppressing the hot weld crack. To enjoy these effects, it is preferred to select the Mo content to be at least 0.01 wt %. On the other hand, an Mo content exceeding 4 wt % will lower the toughness at very low temperatures through crystallization of delta ferrite. Therefore, the Mo content is preferably selected to be 0.01 to 4 wt %.

N: For stabilizing the austenite while ensuring strength at very low temperatures, it is effective to add at least 0.01 wt % of N. On the other hand, however, the generation of blow holes is promoted by the addition of N in excess of 0.2 wt %. The N content, therefore, is preferably selected to range between 0.01 and 0.2 wt %, particularly not smaller than 0.04 wt %.

P, S: P and S in the deposited metal of austenitic steel produce eutectic of low melting temperature in the grain boundaries during the solidification of the deposited metal, resulting in cracking under the action of contraction strain thereby becoming a cause of hot weld crack. The P and S contents, therefore should be made as small as possible. More specifically, the P and S contents should be made 0.03 wt % or smaller in total. Although the better effect is obtained by minimizing the P and S contents, it is meaningless to decrease the sum of P and S contents down below 0.005 wt %, because reduction of P and S contents below 0.005 wt % requires an enromous effort.

Al, Ti, Zr, Ca, Mg and Y:

These elements promote deoxidation reaction during melting to enhance the deoxidation effect, thereby to increase the toughness at very low temperatures. From this point of view, the deposited metal preferably contains at least one of these elements by at least 0.005 wt % in total. The sum of contents of these elements, however, should not exceed 0.5 wt % because such large content promotes the tendency of hot weld crack. the contents of these elements in total, therefore, should be selected to range between 0.005 and 0.5 wt %.

Rare earth elements:

The rare earth elements exhibit high affinity to P and S to fix the same, thereby to permit the removal of most of P and S as a slag during welding. Thus, the rare earth elements are effective in excluding residual P and S which are elements causing hot weld crack. In order to prevent the hot weld crack, therefore, it is preferred to add at least 0.005 wt % of rare earth elements in total. The rare earth metals, however, promote the hot weld crack when the total content exceeds 0.5 wt %. For these reasons, the total content of the rare earth elements should be selected to range between 0.005 and 0.5 wt %. Among various rare earth elements, La, Ce and Nd can be used most suitably.

4. Structure of Deposited Metal

The absorbed energy of the deposited metal at 4.2° K. is seriously impaired by the presence of delta ferrite. From this point of view, it is preferred to obtain a fully austenite structure which does not contain the delta ferrite at all or contains only trace of the same. The composition range of steel for attaining fully austenite structure in the deposited metal can be determined by the relationship between the Ni equivalent and Cr equivalent which are calculated by the following formulas on the basis of each constituent in weight percent.

Ni equivalent(wt %)=Ni(wt %)+30×C(wt %)+20×N(wt %)

Cr equivalent(wt %)=Cr(wt %)+Mo(wt %)+1.5×Si(wt %)

That is, the deposited metal having fully austenite structure can be obtained by selecting the Ni equivalent to be not smaller than a value determined by −12+1.33×Cr equivalent(wt %).

5. Formation of Deposited Metal

The deposited metal is preferably formed by arc welding employing a covered welding rod with a flux, or by TIG (Tungsten Inert Gas Arc) welding or MIG (Metal Inert Gas Arc) welding employing a filler metal.

6. Ni Equivalent

The Ni equivalent given by the formula mentioned before preferably ranges between 17 and 22 wt %. The absorbed energy at 4.2° K. is remarkably increased to about 7 Kg-m or higher when the Ni equivalent exceeds 17 wt %. The increase in the absorbed energy, however, is substantially saturated when the Ni equivalent is increased beyond 18.5 wt %. Accounting also for the economy, the Ni equivalent is preferably maintained below 22 wt %.

DESCRIPTION OF THE PREFERRED EMBODIMENTS

Embodiment 1

MIG welding was conducted on a plate of SUS 304LN (25 mm thick, 100 mm wide and 250 mm long), using the welding wires of compositions shown in Table 1. The welding was conducted as butt welding within the atmosphere of argon gas as the shielding gas, under the condition of welding current of 300 A and welding speed of 35 cm/min to form 13 (thirteen) welding layers on a 60° V-shaped bevel. Evaluation of hot weld crack, analysis of P, S and oxygen contents, measurement of amount of delta ferrite and measurement of absorbed energy by impact test at 4.2° K. were conducted with the thus obtained deposited metals. Table 2 shows the chemical compositions (wt %) of the deposited metals formed with the wires in accordance with the invention, together with those of the deposited metals formed with one of comparison wires. There is no substantial difference between the compositions of the deposited metal and those of the welding wires.

The P+S contents and the oxygen contents of the deposited metals are shown in Table 3. The chemical compositions of the deposited metals were examined with the surface poritons of respective deposited metals where there is no dilution with the base metals.

The evaluation of resistance to hot weld crack was made by obtaining the sum of numbers of cracks in the deposited metals in 5 (five) sections of the welded joint taken along the weld line.

The amount of delta ferrite was measured by means of a ferrite indicator.

Figure 1:
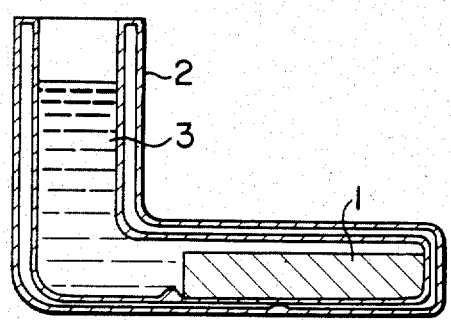
FIG. 1 is an illustration of an impact test conducted at 4.2° K.

The absorbed energy at 4.2° K. was measured by, as shown in FIG. 1, using No. 4 test piece 1 specified by JIS, within a double-walled glass vessel 2 filled with liquid helium 3. The impact test was conducted by measuring the amount of energy absorbed by the test piece in the vessel, using a known impact tester.

The deposited metal obtained by the wires in accordance with the invention had a trace amount of oxide. When the deposited metal contains delta ferrite, since the amount of oxygen capable of dissolving into the delta ferrite is high, there is no substantial effect on the absorbed energy. On the other hand, however, when the deposited metal has a fully austenite structure, since the amount of oxygen capable of dissolving into the austenite is low, the oxygen affects the absorption energy.

this Table, since the deposited metal obtained by the wire according to the invention has low oxygen and P+S contents, the hot weld crack does not occur. In addition, high absorbed energy exceeding about 7 Kg-m at 4.2° K. is obtained because the deposited metal has low oxygen content and does not contain delta ferrite.

Paragraph 2, Article 48 of the Special Equipment Examination Rule in The High-Pressure Gas Management Law requires the absorbed energy and impact strength of at least 1.4 Kg-m and 1.75 Kg-m/cm$^2$, respectively, at 4.2° K. It is also required that the 0.2 % proof stress at 4.2° K. be at least 20 Kg/mm$^2$. These values are demanded in view of the design stress in the design of welded structure for use at very low temperatures, such as torque tube, vessel, etc. of superconducting generator.

Figure 2:
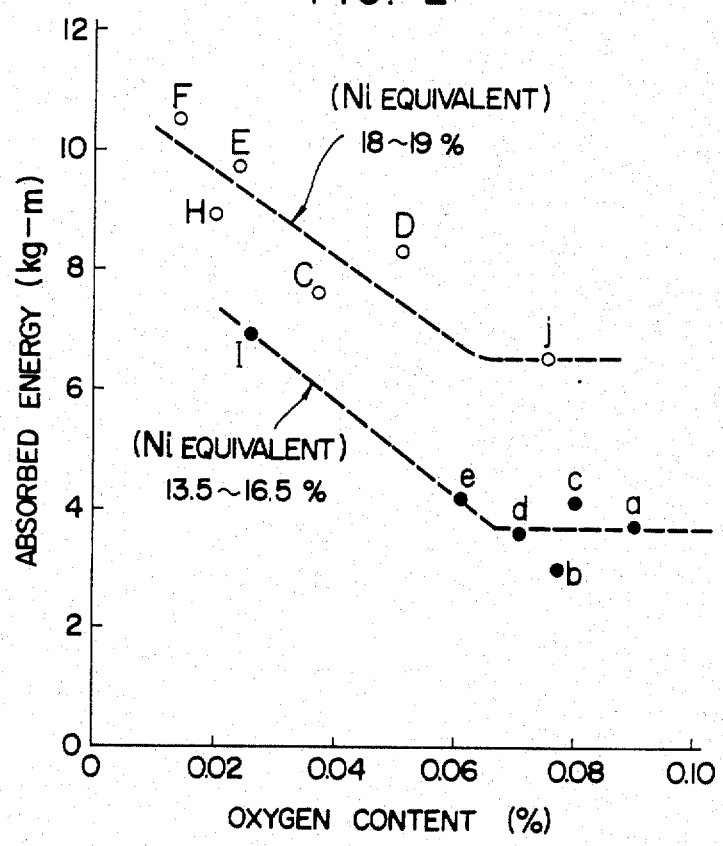
FIGS. 2 to 4 are diagrams showing how the oxygen content, Ni equivalent and amount of delta ferrite in deposited metal, respectively, affect the absorbed energy at 4.2° K.

FIG. 2 is a diagram showing the relationship between the oxygen content of the deposited metal and the absorbed energy measured in the impact test at 4.2° K. As will be seen from this Figure, the deposited metal exhibits a drastic increase in the absorbed energy and, hence, a high toughness at very low temperatures, with the oxygen content not greater than 0.06 wt %, in either case of Ni equivalents between 18 and 19 wt % and

TABLE 1

| | symbols | C | Si | Mn | Ni | Cr | Mo | N | Ti | Al | Ce | La | Nd | others | Fe | Ni equivalent | Cr equivalent |
|---|---|---|---|---|---|---|---|---|---|---|---|---|---|---|---|---|---|
| comparison wires | a | 0.06 | 0.46 | 1.66 | 10.57 | 19.31 | 0.07 | 0.06 | — | — | — | — | — | — | Balance | 13.6 | 20.1 |
| | b | 0.07 | 0.44 | 1.52 | 10.82 | 20.56 | 0.08 | 0.07 | — | — | — | — | — | — | " | 14.3 | 21.3 |
| | c | 0.03 | 0.60 | 1.97 | 11.49 | 19.08 | 0.01 | 0.08 | — | — | — | — | — | — | " | 14.0 | 20.0 |
| | d | 0.03 | 0.57 | 1.91 | 11.14 | 19.84 | 0.01 | 0.09 | — | — | — | — | — | — | " | 13.8 | 20.7 |
| | e | 0.04 | 0.59 | 3.95 | 14.15 | 20.05 | 2.58 | 0.04 | — | — | — | — | — | — | " | 16.2 | 23.5 |
| | f | 0.03 | 0.34 | 1.71 | 10.25 | 19.45 | 0.01 | 0.04 | — | — | — | — | — | — | " | 12.0 | 20.0 |
| | g | 0.03 | 0.37 | 1.76 | 12.20 | 18.97 | 2.51 | 0.04 | — | — | — | — | — | — | " | 13.9 | 22.0 |
| | h | 0.07 | 0.54 | 1.82 | 8.72 | 20.95 | 0.01 | 0.14 | — | — | — | — | — | — | " | 13.6 | 21.8 |
| | i | 0.04 | 0.41 | 4.10 | 13.11 | 19.49 | 2.82 | 0.02 | — | — | — | — | — | — | " | 14.7 | 22.9 |
| | j | 0.04 | 0.37 | 1.80 | 16.20 | 18.81 | 2.21 | 0.04 | — | — | — | — | — | — | " | 18.2 | 21.6 |
| wires in accordance with invention | A | 0.03 | 0.10 | 5.98 | 15.82 | 18.04 | 2.47 | 0.02 | 0.15 | — | 0.02 | 0.01 | 0.01 | — | " | 17.1 | 20.7 |
| | B | 0.01 | 0.22 | 5.71 | 16.38 | 17.66 | 2.19 | 0.05 | 0.16 | — | 0.03 | 0.01 | 0.01 | — | " | 17.7 | 20.2 |
| | C | 0.04 | 0.38 | 4.10 | 16.21 | 18.79 | 2.82 | 0.04 | 0.23 | 0.02 | — | 0.24 | — | — | " | 18.2 | 22.2 |
| | D | 0.04 | 0.26 | 4.31 | 16.25 | 17.81 | 3.85 | 0.03 | 0.34 | 0.02 | 0.18 | 0.07 | 0.05 | Mg 0.03 | " | 18.1 | 22.1 |
| | E | 0.05 | 0.24 | 1.13 | 16.41 | 21.43 | 0.01 | 0.03 | 0.42 | — | 0.08 | 0.04 | 0.03 | Mg 0.02 Ca 0.02 | " | 18.5 | 21.8 |
| | F | 0.04 | 0.31 | 5.48 | 17.04 | 17.58 | 2.63 | 0.04 | 0.05 | — | 0.05 | 0.02 | 0.01 | Zr 0.25 Y 0.02 | " | 19.0 | 20.7 |
| | G | 0.05 | 0.27 | 9.87 | 18.83 | 17.98 | 3.81 | 0.05 | 0.18 | 0.02 | 0.03 | 0.01 | 0.01 | Ca 0.02 | " | 21.3 | 22.3 |
| | H | 0.06 | 0.29 | 6.33 | 16.79 | 17.73 | 2.47 | 0.03 | 0.14 | 0.02 | 0.02 | 0.01 | 0.01 | Mg 0.01 | " | 19.2 | 20.6 |
| | I | 0.09 | 0.49 | 8.08 | 12.35 | 18.55 | 0.53 | 0.07 | — | — | 0.02 | 0.01 | 0.01 | Zr 0.21 Mg 0.010 Ca 0.012 | " | 16.5 | 19.8 |

TABLE 2

| symbols | C | Si | Mn | Ni | Cr | Mo | N | others | | Fe | Ni equivalent | Cr equivalent |
|---|---|---|---|---|---|---|---|---|---|---|---|---|
| A | 0.03 | 0.12 | 5.92 | 15.85 | 18.11 | 2.45 | 0.02 | Ti 0.12 Ce 0.015 | La 0.005 Nd 0.008 | Balance | 17.2 | 20.7 |
| B | 0.01 | 0.18 | 5.86 | 16.23 | 17.77 | 2.46 | 0.04 | Ti 0.13 Ce 0.002 | La 0.007 Nd 0.005 | " | 17.3 | 20.5 |
| C | 0.04 | 0.39 | 4.06 | 16.17 | 18.68 | 2.80 | 0.04 | Ti 0.17 Al 0.01 | La 0.16 | " | 18.2 | 22.1 |
| D | 0.05 | 0.22 | 4.28 | 16.19 | 17.85 | 3.81 | 0.04 | Ti 0.26 Al 0.01 Mg 0.01 | Ce 0.12 La 0.04 Nd 0.02 | " | 18.5 | 22.0 |
| E | 0.05 | 0.19 | 1.21 | 16.46 | 21.51 | 0.01 | 0.03 | Ti 0.38 Mg 0.01 Ca 0.01 | Ce 0.06 La 0.02 Nd 0.02 | " | 18.6 | 21.8 |
| h | 0.06 | 0.42 | 2.13 | 8.67 | 21.40 | — | 0.15 | — | | " | 13.5 | 22.0 |

Table 3 shows the resistance to hot weld crack, P+S content, oxygen content, amount of delta ferrite, absorbed energy, 0.2 % proof stress and reduction of area at 4.2° K. in these deposited metals. As will be seen from between 13.5 and 16.5 wt %. Particularly, it is noted that, in the deposited metal having the Ni equivalent ranging between 18 and 19 wt %, a high absorbed energy in excess of about 7 Kg-m is obtained when the oxygen content is less than 0.05 wt %. It is, therefore, understood that a sufficiently high absorbed energy is obtainable with reduced oxygen content. The reference symbol appearing in this Figure corresponds to that used in Table 3, and represents deposited metal having a delta ferrite content less than 4 vol. %.

Figure 3:
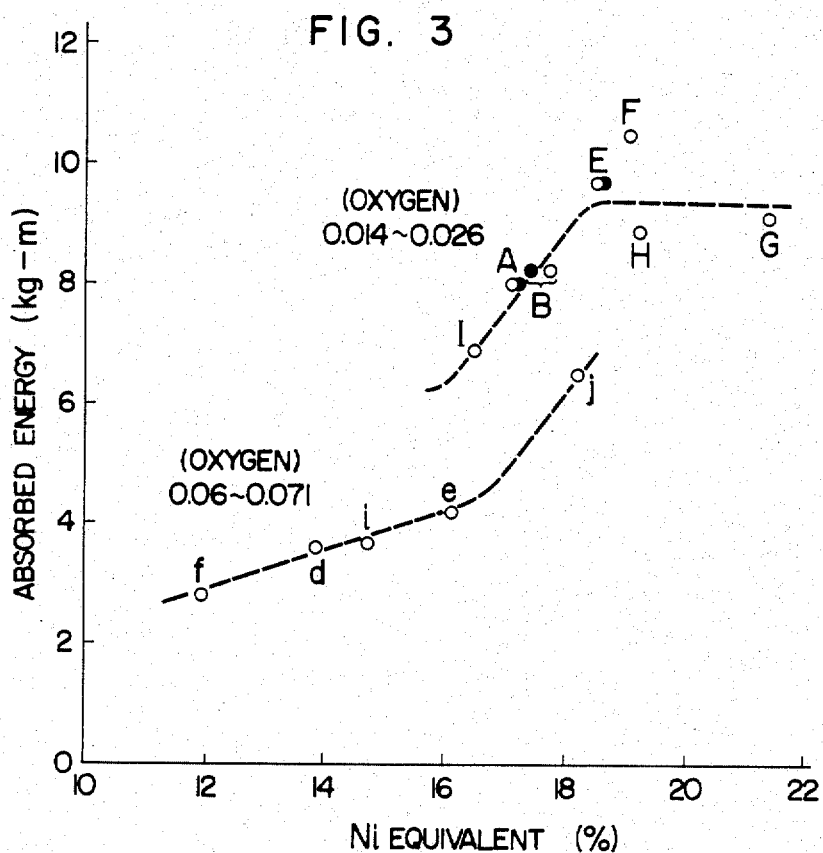

Referring now to FIG. 3 showing the relationship between the Ni equivalent and the absorbed energy measured in the impact test at 4.2° K., the absorbed energy is drastically increased when the Ni equivalent is increased beyond 17 wt %. Particularly, a high absorbed energy exceeding 7 Kg-m is obtained when the oxygen content ranges between 0.014 and 0.026 wt %. The increasing tendency of the absorbed energy, however, is substantially saturated when the Ni equivalent reaches 18.5 wt %, and further increase in Ni equivalent does not produce any remarkable effect. Taking also the economy into account, it is advisable not to increase the Ni content beyond 22 wt %.

Reference symbol appearing in this Figure corresponds to that in Tables 1 and 2. The solid dot shows datum obtained on the basis of the chemical composition of the deposited metal, while the blank dot shows datum obtained on the basis of the chemical composition of the welding wire. The data plotted in this Figure are data for the samples containing not greater than 4 vol. % of delta ferrite.

Figure 5:
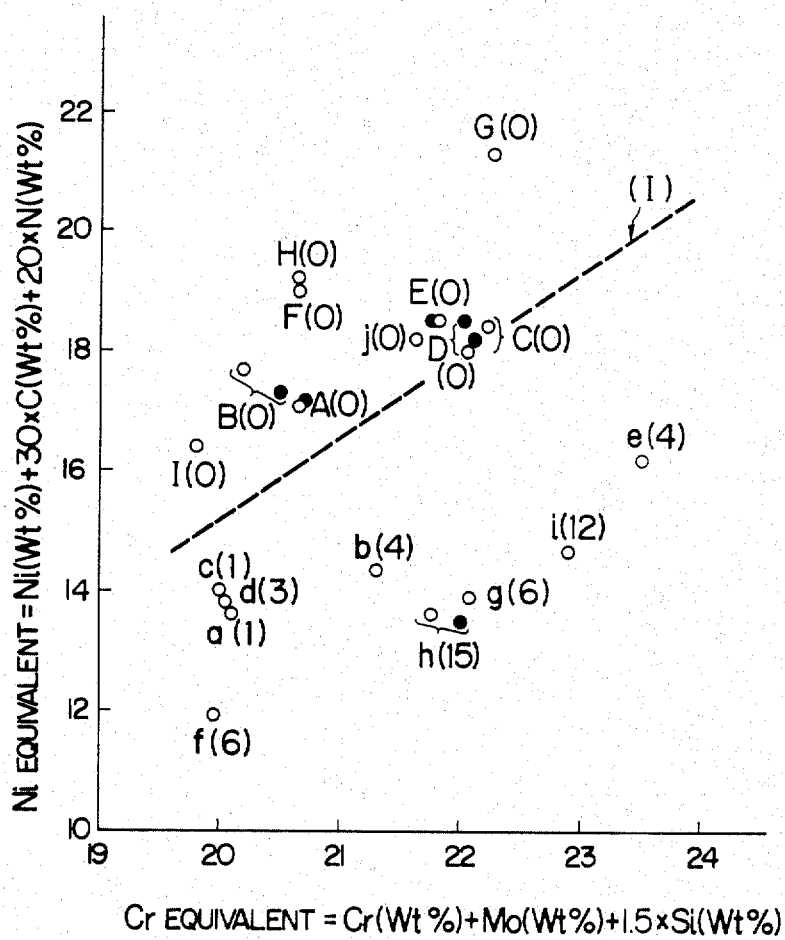
FIG. 5 is a diagram showing how the generation of delta ferrite is affected by the relationship between Ni equivalent and Cr equivalent.

FIG. 5 shows the relationship between the Ni equivalent (wt %) and Cr equivalent (wt %) which are determined as follows, respectively.

$$\text{Ni equivalent(wt \%)} = \text{Ni(wt \%)} + 30 \times \text{C(wt \%)} + 20 \times \text{N(wt \%)}$$

$$\text{Cr equivalent(wt \%)} = \text{Cr(wt \%)} + \text{Mo(wt \%)} + 1.5 \times \text{Si(wt \%)}$$

The broken line in this Figure is determined by the following formula.

$$\text{Ni equivalent(wt \%)} = -12 + 1.33 \times \text{Cr equivalent(wt \%)}$$

It is possible to obtain the deposited metal of substantially fully austenite structure by selecting the Ni equivalent to be greater than the value given by the above formula.

In this Figure, the blank dot shows the Ni equivalent and Cr equivalent as obtained with the composition of the welding wire shown in Table 1, while solid dot shows the Ni equivalent and Cr equivalent as obtained with the composition of deposited metal shown in Table 2. In this Figure, reference symbols represent those of alloys shown in Tables 1, 2 and 3. Numeral appearing in parentheses ( ) shows the amount of delta ferrite in

TABLE 3

| symbols | | P + S (wt %) | number of hot weld crack (n) | oxygen (wt %) | delta ferrite (vol %) | properties at 4.2° K. | | |
|---|---|---|---|---|---|---|---|---|
| | | | | | | absorbed energy (Kg-m) | 0.2% proof stress (Kg/mm$^2$) | reduction of area (%) |
| composition wires | a | 0.054 | 9 | 0.090 | 1 | 3.7 | 92 | 22 |
| | b | 0.063 | 4 | 0.077 | 4 | 3.0 | 100 | 22 |
| | c | 0.048 | 8 | 0.080 | 1 | 4.1 | 91 | 23 |
| | d | 0.067 | 5 | 0.071 | 3 | 3.6 | 94 | 20 |
| | e | 0.062 | 4 | 0.061 | 4 | 4.2 | 82 | 24 |
| | f | 0.038 | 2 | 0.065 | 6 | 2.8 | 78 | 21 |
| | g | 0.043 | 3 | 0.072 | 6 | 2.3 | 79 | 22 |
| | h | 0.127 | 1 | 0.069 | 15 | 0.9 | 125 | 19 |
| | i | 0.094 | 1 | 0.065 | 12 | 0.7 | 75 | 13 |
| | j | 0.042 | 0 | 0.075 | 0 | 6.5 | 81 | 24 |
| wires in accordance with invention | A | 0.028 | 0 | 0.015 | 0 | 8.0 | 73 | 24 |
| | B | 0.017 | 0 | 0.022 | 0 | 8.2 | 80 | 25 |
| | C | 0.023 | 0 | 0.037 | 0 | 7.6 | 81 | 23 |
| | D | 0.020 | 0 | 0.051 | 0 | 8.3 | 79 | 24 |
| | E | 0.019 | 0 | 0.024 | 0 | 9.7 | 79 | 27 |
| | F | 0.016 | 0 | 0.014 | 0 | 10.5 | 81 | 25 |
| | G | 0.012 | 0 | 0.018 | 0 | 9.1 | 88 | 24 |
| | H | 0.017 | 0 | 0.020 | 0 | 8.9 | 170 | 26 |
| | I | 0.020 | 0 | 0.026 | 0 | 6.9 | 102 | 23 |

Figure 4:
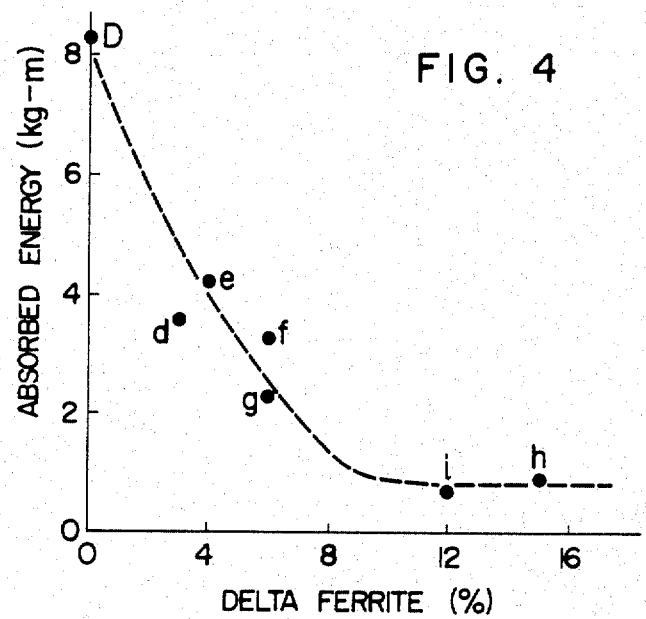

FIG. 4 is a diagram showing the relationship between the delta ferrite content and the absorbed energy in an impact test at 4.2° K., as observed with deposite metals having oxygen contents of between 0.051 and 0.072 wt %. As will be seen from this Figure, the absorbed energy is increased drastically when the delta ferrite content is less than 8 vol. %. The deposited metals obtained with the welding wire specified by the invention had fully austenite structure having no delta ferrite and, hence, showed the highest levels of absorbed energy of not smaller than 7 Kg-m. As stated before, the deposited metal containing delta ferrite which has ferromagnetic nature is not preferred for use as the material of the container, etc. for superconducting magnet of generator. It will be understood that the welded structure of the invention is preferred also from this point of view. Reference symbol appearing in this Figure corresponds to that used in Table 3.

terms of vol. %.

Figure 6:
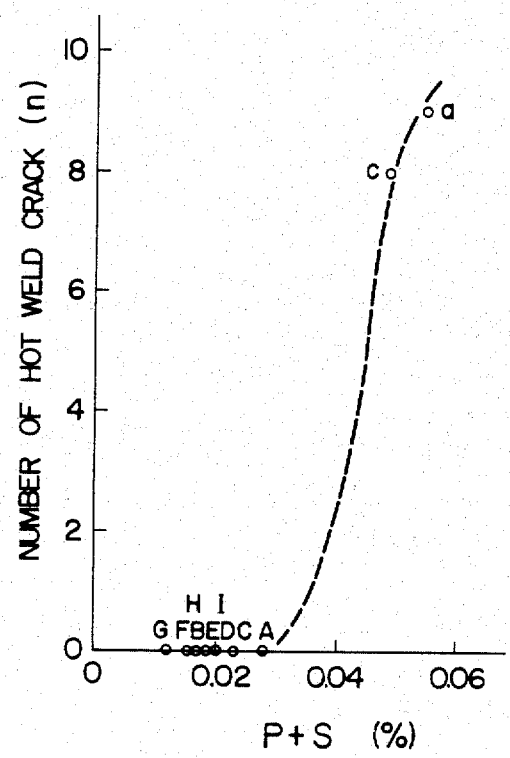
FIG. 6 is a diagram showing the relationship between the P+S content of deposited metal and the hot weld crack in the deposited metal.

FIG. 6 is a diagram showing the relationship between the number of the hot weld crack and the S + P content in the deposited metal. It will be understood from this Figure that the hot weld crack can be perfectly eliminated by reducing the P + S content down below 0.03 wt %. The data shown in this Figure were obtained with deposited metals having delta ferrite content not greater than 1 vol % and deposited metals of fully austenite structure. Reference symbol representing the alloy in Table 3 is used also in this Figure.

Embodiment 2

Figure 7:
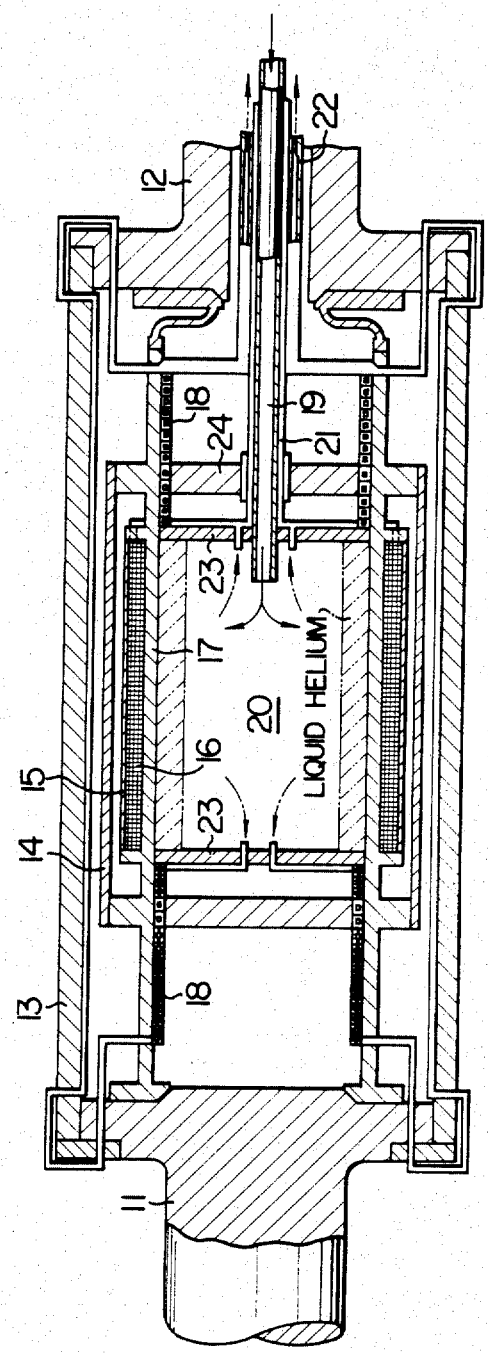
FIG. 7 is a sectional view of the rotor of a superconducting generator.

FIG. 7 is a sectional view of a typical example of superconducting generator rotor employing the welded structure for use at very low temperatures in accordance with the invention.

As will be seen from this Figure, the superconducting rotor is composed of a multiplicity of cylinders supported by a drive shaft 11 and an inlet/outlet shaft 12. More specifically, the superconducting rotor is constituted by an outer damper 13, inner damper 14, vessel 15, superconducting magnetic field coil 16, torque tube 17, cooling duct 18, etc.

The outer damper 13, which is a vacuum vessel, serves as an electric damper and also as a high-frequency electromagnetic shield, while the inner damper 14 serves as a shield against heat radiation, as well as low-frequency electromagnetic shield. The vessel 15 contains the superconducting magnetic field coil 16 and is filled with liquid helium so that the coil 16 is effectively cooled by the liquid helium. The liquid helium is introduced through a liquid helium inlet pipe 19 and is stored in a liquid helium tank 20. The torque tube 17, to which the superconducting magnetic field coil 16 is secured, is perforated to permit the liquid helium in the tank 20 to come into and out of the tank by a convection under the influence of the centrifugal force, thereby to cool the superconducting magnetic field coil 16. The liquid helium tank 20 is constituted by the torque tube 17 and the partition walls 23. The torque tube 17 transmits the torque of a prime mover to the superconducting magnetic field coil 16. The helium evaporated through heat exchange with the superconducting magnetic field coil 16 is made to flow along the cooling duct 18 constituting the passage for the helium gas, towards the higher temperature side, thereby to prevent invasion by heat conducted from the outside through the torque tube 17. The cooling duct 18 is supported by a supporting end plate 24. The electric current for exciting the magnetic field coil is supplied through a power lead 21. The helium gas after the cooling is discharged to the outside of the rotor through a helium gas outlet pipe 22. The power lead 21, liquid helium inlet pipe 19 and the helium gas outlet pipe 22 are extended through the inlet/outlet shaft 12 and are connected to the stationary part of the generator by means of slip rings and helium supply/discharge means, respectively.

Figure 9:
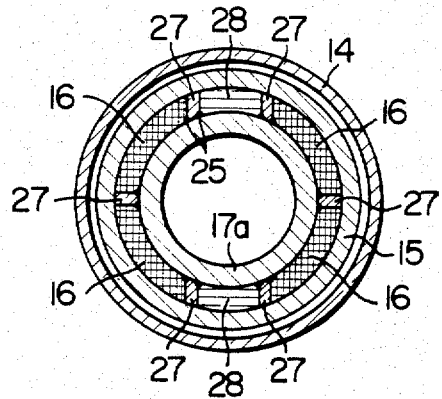
FIG. 9 is a sectional view taken along the line IX—IX of FIG. 8.
Figure 8:
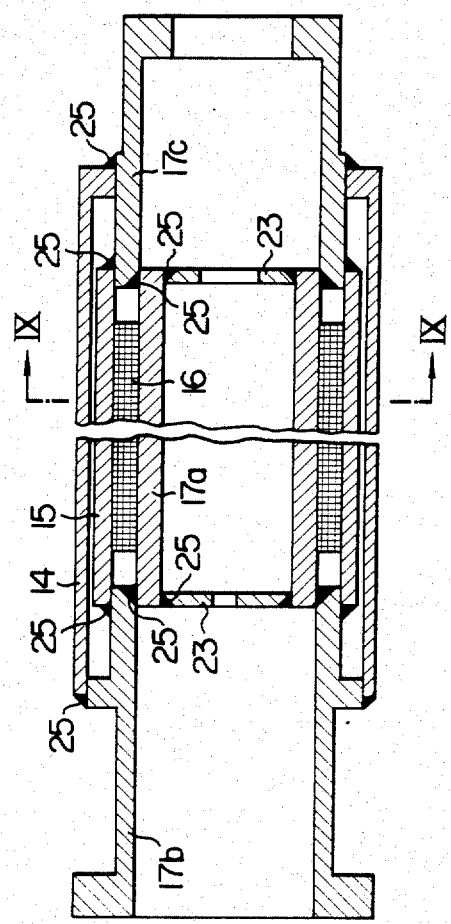
FIG. 8 is a sectional view showing the weld part of a container for superconducting magnet.

FIG. 8 illustrates the weld portions of the parts subjected to very low temperatures in the superconducting rotor, i.e. the inner damper 14, vessel 15, the torque tube 17, etc., while FIG. 9 is a sectional view taken along the line IX—IX of FIG. 8. the inner damper 14, vessel 15 and the torque tube 17a, 17b, 17c with projection 27 in combination constitute a superconducting magnet container which surrounds the superconducting magnetic field coil 16 from the outside thereof. A reference numeral 28 designates a spacer.

This superconducting magnet container is fabricated by welding cylinders of an austenic stainless steel with a deposited metal 25 having an austenite structure. In FIGS. 8 and 9, the blackened triangular mark represents the deposited metal 25. The deposited metal was produced by arc welding with covered electrode. Table 4 shows the chemical composition (wt %) of the structural material, i.e. the base metal, used in the production of the superconducting magnet container. The base metal had a fully austenite structure.

TABLE 4

| C | Si | Mn | Ni | Cr | Mo | N | Fe |
|---|---|---|---|---|---|---|---|
| 0.02 | 0.54 | 1.08 | 10.12 | 18.08 | 0.01 | 0.15 | Balance |

Table 5 shows the chemical composition (wt %) of the welding electrode used in the welding.

TABLE 5

| C | Si | Mn | Ni | Cr | Mo | N | Ti | Fe |
|---|---|---|---|---|---|---|---|---|
| 0.04 | 0.40 | 4.20 | 17.20 | 17.61 | 2.68 | 0.018 | 0.14 | balance |

Table 6 shows the condition under which the arc welding was conducted.

TABLE 6

| electrode dia. (mm) | polarity | current (A) | voltage (V) | welding speed (mm/min.) |
|---|---|---|---|---|
| 5 | D.C. reverse | 150~200 | 25~30 | 120~150 |

The superconducting magnet container of the invention, produced by welding as explained above, had a fully austenite structure with an oxygen content of 0.035 wt %, and showed no hot weld crack at all.

As will be understood from the foregoing description, the present invention provides a welded structure in which the deposited metal exhibits a high toughness at very low temperatures. The welded structure of the invention, therefore, can be used suitably in various machines and equipments operated at very low temperatures, such as the container for the supercon ducting magnet and the like.

Although the invention has been described through specific terms, it is to be noted here that the described embodiments are only illustrative and various changes and modifications may be imparted thereto without departing from the scope of the invention which is limited solely by the appended claims.

What is claimed is:

1. A welded structure for use at very low temperatures of below −150° C., said welded structure being a container housing a magnet of a superconducting generator rotor and having structural metallic members of austenitic stainless steel welded together with a deposited metal of austenitic stainless steel, wherein said structural metallic members have a chemical composition consisting essentially of 0.01 to 0.1 wt. % of C, 0.05 to 1 wt. % of Si, 1 to 10 wt. % of Mn, 8 to 20 wt. % of Ni, 16 to 22 wt. % of Cr and the balance substantially Fe and have a fully austenite structure; and said deposited metal has a chemical composition consisting essentially of 0.01 to 0.1 wt. % of C, 0.05 to 1 wt. % of Si, 1 to 10 wt. % of Mn, 8 to 20 wt. % of Ni, 16 to 22 wt. % of Cr, not greater than 0.03 wt. % of P+S, not greater than 0.06 wt. % of oxygen, 0.005 to 0.5 wt. % of at least one of the elements selected from the group consisting of Al, Ti, Zr, Mg, Ca, Y and a rare earth element and the balance substantially Fe; said deposited metal having a fully austenite structure.

2. A welded structure for use at very low temperatures of below −150° C., said welded structure being a container housing a magnet of a superconducting generator rotor and having structural metallic members of austenitic stainless steel welded together with a deposited metal of austenitic stainless steel, wherein said structural metallic members have a chemical composition consisting essentially of 0.01 to 0.1 wt. % of C, 0.05 to 1 wt. % of Si, 1 to 10 wt. % of Mn, 8 to 20 wt. % of Ni, 16 to 22 wt. % of Cr, at least one of 0.01 to 4 wt. % of Mo and 0.01 to 0.2 wt. % of N and the balance substantially Fe and have a fully austenite structure; and said deposited metal has a chemical composition consisting essentially of 0.01 to 0.1 wt. % of C, 0.05 to 1 wt.

% of Si, 1 to 10 wt. % of Mn, 8 to 20 wt. % of Ni, 16 to 22 wt. % of Cr, at least one of 0.01 to 4 wt. % of Mo and 0.01 to 0.2 wt. % of N, not greater than 0.03 wt. % of P+S, not greater than 0.06 wt. % of oxygen, 0.05 to 0.5 wt. % of at least one of the elements selected from the group consisting of Al, Ti, Zr, Mg, Ca, Y and a rare earth element and the balance substantially Fe and has a fully austenite structure.

3. A welded structure for use at very low temperatures according to claim 1, wherein the Ni equivalent of said deposited metal, determined by the following formula, ranges between 17 and 22 wt. %:

Ni equivalent=Ni(wt. %)+30×C(wt. %)+20×N(wt. %).

4. A welded structure for use at very low temperatures according to claim 2, wherein the Ni equivalent of said deposited metal, determined by the following formula, ranges between 17 and 22 wt. %:

Ni equivalent=Ni(wt. %)+30×C(wt %)+20×N(wt %).

5. A welded structure for use at very low temperatures according to claim 1, wherein said container housing the magnet is comprised of an inner damper, vessel and a torque tube which are made of an austenitic stainless steel, and said magnet comprises a super-conducting magnetic field coil cooled by liquid helium which is accommodated between said vessel and said torque tube.

6. A welded structure for use at very low temperatures according to claim 2, wherein said container housing the magnet is comprised of an inner damper, vessel and a torque tube which are made of an austenitic stainless steel, and said magnet comprises a superconducting magnetic field coil cooled by liquid helium which is accommodated between said vessel and said torque tube.

7. An electric rotary machine having a superconducting rotor, wherein said superconducting rotor comprises a drive shaft having at an end thereof a flange portion, a hollow shaft confronting said drive shaft with a gap therebetween and having a flange portion, a torque tube connected between said flange portions, a magnetic field coil provided on an outer peripheral surface of said torque tube, a vessel surrounding said magnetic field coil, a coolant pool formed inside said torque tube, collant supply means for supplying a coolant to said coolant pool through said hollow shaft, a cylindrical inner damper provided so as to surround said vessel, a cylindrical outer damper disposed so as to surround said inner damper and connected between said flange portions, coolant discharge means for collecting said coolant from said coolant pool through said hollow shaft, and a power lead passing through said hollow shaft for supplying said magnetic field coil with electric power, and wherein said torque tube, said vessel and said inner damper are made of an austenitic stainless steel having a chemical composition consisting essentially of 0.01 to 0.1 wt. % of C, 0.05 to 1 wt. % of Si, 1 to 10 wt. % of Mn, 8 to 20 wt. % of Ni, 16 to 22 wt. % of Cr and the balance substantially Fe and having a fully austenite structure; and said torque tube and said vessel and said torque tube and said inner damper are, respectively, welded together with a deposited metal of austenitic stainless steel having a chemical composition consisting essentially of 0.01 to 0.1 wt. % of C, 0.05 to 1 wt. % of Si, 1 to 10 wt. % of Mn, 8 to 20 wt. % of Ni, 16 to 22 wt. % of Cr, not greater than 0.03 wt. % of P+S, not greater than 0.06 wt. % of oxygen, 0.005 to 0.5 wt. % of at least one of the elements selected from the group consisting of Al, Ti, Zr, Mg, Ca, Y and a rare earth element and the balance substantially Fe; said deposited metal having a fully austenite structure.

* * * * *

UNITED STATES PATENT AND TRADEMARK OFFICE
CERTIFICATE OF CORRECTION

PATENT NO. : 4,529,669

DATED : July 16, 1985

INVENTOR(S) : Takanobu Mori

It is certified that error appears in the above-identified patent and that said Letters Patent is hereby corrected as shown below:

In column 11, line 4 thereof (line 18 of Claim 2), please correct

"0.05" to read -- 0.005 --.

Signed and Sealed this

Twenty-fourth Day of January, 1989

Attest:

DONALD J. QUIGG

Attesting Officer

Commissioner of Patents and Trademarks